March 19, 1935.  O. C. RITZ-WOLLER  1,994,738
WINDSHIELD WIPER
Filed Nov. 9, 1934
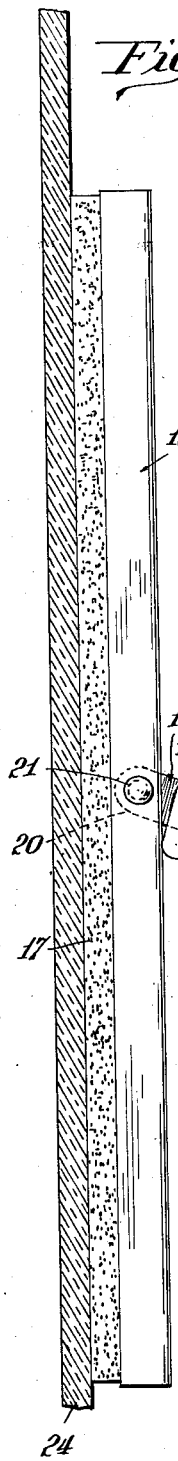
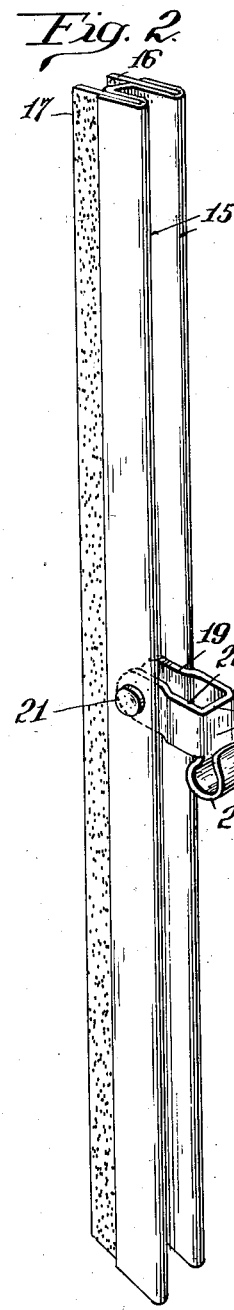
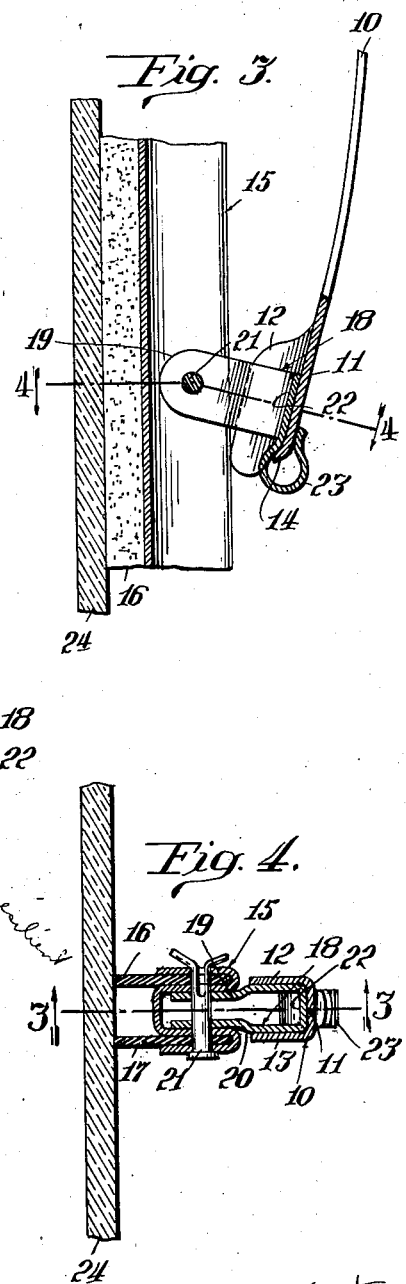
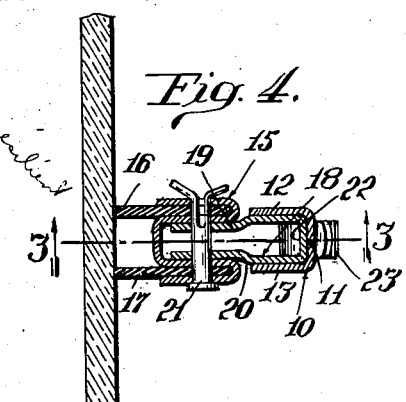
Inventor
Oliver C. Ritz-Woller
By Fricke & DeBusk
Attorneys Patented Mar. 19, 1935

1,994,738

UNITED STATES PATENT OFFICE 1,994,738

WINDSHIELD WIPER

Oliver C. Ritz-Woller, Chicago, Ill.

Application November 9, 1934, Serial No. 752,195

5 Claims. (Cl. 15—250)

My invention relates to windshield wipers of the type comprising an arm adapted to oscillate about a rock shaft as a center and a wiper blade connected with said arm so as to be held by the arm pressed firmly against the surface of the windshield, and it has for its object the provision of a new and improved form and arrangement of connecting parts whereby the wiper blade assembly may be quickly and readily attached in operative position without the use of tools and may be again as easily detached from the arm whenever desired, the arrangement being such that the blade is held securely in its desired angular position with respect to the arm and its desired operative position with respect to the face of the windshield throughout the successive strokes of the arm in opposite directions.

It is one of the objects of my invention to provide a construction of this character in which the wiper blade shall have only a limited swinging movement with respect to the arm and in the plane occupied by the blade and the arm, in which the blade shall have but slight if any movement laterally relative to said plane and the arm, and in which the blade shall be held in operative position on the arm independently of any engagement with the windshield. It is another object of my invention to provide a construction in which the operation of attaching the wiper blade in operative position on the arm serves temporarily to distort a yielding part of the structure, the arrangement being such that upon completion of the operation of attaching the wiper blade the yielding part normally exerts a yielding pressure serving to prevent detachment of the blade.

It is another object of my invention to improve devices of this type in sundry details hereinafter pointed out. The preferred means by which I have accomplished my several objects are illustrated in the drawing and are hereinafter specifically described. That which I believe to be new and desire to cover by Letters Patent is set forth in the claims.

In the drawing,—

Fig. 1 is a side face view of the preferred form of my improved structure comprising a wiper blade held in operative pressure relationship to a windshield which is shown in vertical cross section;

Fig. 2 is a perspective view of my improved wiper blade and the connecting means carried thereby;

Fig. 3 is a central sectional view through my improved device, being taken substantially at line 3—3 of Fig. 4; and Fig. 4 is a sectional view taken substantially at line 4—4 of Fig. 3.

Referring now to the several figures of the drawing, in which corresponding parts are indicated by the same reference characters, 10 indicates an arm of any approved type adapted to oscillate about an axis at its upper end, the upper end portion of the arm being broken away in the arrangement shown. At its lower end, the arm 10 is in the form of a channel comprising an intermediate web portion 11 and side plate portions 12 and 13. As is best shown in Fig. 3, the lower end portion of the web 11 of the channel is bent slightly at 14 for effecting engagement with the wiper blade member as hereinafter set forth.

In the arrangement shown, the wiper blade of my improved device comprises a mounting member 15 of sheet metal pressed into position for holding wipers 16 and 17 disposed opposite to each other as is best shown in Fig. 4, with their operative edge portions projecting well beyond the mounting member in spaced relation to each other. For mounting the wiper blade assembly in position, I have provided a seat member 18 in the form of a yoke, the opposite side portions 19 and 20 of which are connected by means of a rivet 21 with the side portions of the mounting member 15 of the blade. As is clearly shown in Fig. 2, the intermediate plate portion 22 of the yoke member connected between the side plate portions 19 and 20 is provided at its lower end with a spring member 23 in the form of an open loop. In the arrangement shown, the spring member 23 is formed integrally with the plate portion 22 of the yoke, the metal being bent for providing a shoulder across the plate 22 at its lower end.

Whenever it is desired that the wiper blade be connected with the arm 10, the seat member 18 is held in substantially the position as shown in Fig. 2 and is presented to the arm 10 in such manner as to enable the turned end portion 14 of the channel to enter the spring loop. The arrangement is such that when the wiper blade member is pushed upwardly with respect to the channel the loop spring 23 is spread slightly toward the right in Fig. 3 for permitting the turned end 14 to slide into operative engagement with the shoulder provided at the lower end of the plate 22, whereupon the spring returns substantially to its normal position. Whenever the blade is to be released from the arm 10, this can be accomplished by moving the yoke member 18 downwardly with respect to the channel portion of the arm, serving again to spread the spring loop 23 to the necessary extent for separating the parts.

In the arrangement shown, the channel portion of the arm has a snug working fit upon the face and about the sides of the seat portion 18 of the blade, whereby the blade is held securely in operative position with respect to the arm and with respect to the windshield 24 against which it normally bears. In the fully engaged position of the parts as shown in Fig. 3, the bent end portion 14 of the web 11 of the channel engages the shoulder at the lower end of the web portion 22 of the yoke 18, serving thus to limit the downward movement of the wiper blade. The blade is limited to a slight upward movement with respect to the arm 10 by engagement of the turned end portion 14 with the lower end of the spring loop.

While I prefer to employ the form of device as shown in my drawing and as above described, it is to be understood that my invention is not limited to the form shown except so far as the claims may be so limited by the prior art.

I claim:—

1. A device of the type described, comprising in combination a wiper blade member having a seat thereon in the form of a transversely-disposed plate portion, an arm comprising a channel adapted to embrace said seat portion, means for limiting the downward movement of the seat in said channel, and spring means serving normally to hold said channel and said seat member in operative interengagement.

2. In a device of the type described, the combination of a wiper blade member having a seat portion in the form of a transversely disposed plate having a shoulder thereacross, an arm comprising a channel adapted to have a snug working fit about the face and sides of said seat portion and having an end portion adapted to engage said shoulder, and spring means carried by said blade member adapted normally by engagement with the channel to hold the channel and said seat portion in effective interengagement.

3. In a device of the type described, the combination of a wiper blade member having a seat portion in the form of a yoke comprising side plate portions and a transversely disposed plate portion between said side plate portions, an arm comprising a channel adapted to have a snug working fit about said yoke and having a portion adapted by engagement with the yoke to limit downward movement of the wiper blade with respect to the arm, and spring means serving normally to hold said channel and said seat portion in effective interengagement.

4. In a device of the type described, the combination of a wiper blade, a seat member in the form of a yoke pivotally mounted on said wiper blade with the intermediate portion of the yoke transversely disposed between the side plate portions, an arm comprising a channel adapted to have a snug working fit about said yoke and having its intermediate portion bent for engaging said seat member, and spring means normally pressing said channel and said seat member together whereby the bent intermediate portion of the channel serves normally by its engagement with the seat member to prevent disengagement of the channel longitudinally thereof from the seat member.

5. In a device of the type described, the combination of a wiper blade, a seat member in the form of a yoke pivotally mounted on said wiper blade with the intermediate portion of the yoke transversely disposed between the side plate portions, an arm comprising a channel adapted to have a snug working fit about said yoke and having a portion adapted by engagement with the seat member to limit downward movement of the wiper blade with respect to the arm, and a spring in the form of an open loop carried by said yoke into which said channel is movable longitudinally and of such size and shape as to be distorted when said channel is moved longitudinally into engagement with said seat member whereby said channel and seat member are held in effective interengagement.

OLIVER C. RITZ-WOLLER.